United States Patent [19]

Ohrman

[11] 4,151,566
[45] Apr. 24, 1979

[54] MAGNETIC TAPE POSITION MEASURING SYSTEM

[75] Inventor: Timothy P. Ohrman, Marlton, N.J.

[73] Assignee: RCA Corporation, New York, N.Y.

[21] Appl. No.: 855,708

[22] Filed: Nov. 29, 1977

[51] Int. Cl.² ............................................. G11B 15/18
[52] U.S. Cl. .................................. 360/72.1; 360/38; 360/37
[58] Field of Search ..................... 360/72, 73, 71, 38, 360/37, 33, 14; 358/127

[56] References Cited

U.S. PATENT DOCUMENTS

| | | | |
|---|---|---|---|
| 3,897,379 | 7/1975 | DeFrancesco | 360/38 |
| 4,037,260 | 7/1977 | Busby | 360/73 |
| 4,044,389 | 8/1977 | Oldershaw | 360/73 |
| 4,062,048 | 12/1977 | Weber | 360/72 |

OTHER PUBLICATIONS

RCA Catalog TA. 3950–Video Tape Editor.
Tape Address Detector Subsystem; by Schaefer et al., IBM Tech. Disc. Bull.; vol. 13, No. 10, Mar. 1971, pp. 2855-2856.

Primary Examiner—Bernard Konick
Assistant Examiner—Alan Faber
Attorney, Agent, or Firm—Eugene M. Whitacre; Paul J. Rasmussen; Robert L. Troike

[57] ABSTRACT

A magnetic tape position measuring system utilizes a detector and counter circuit which is responsive to the prerecorded control track signal of a magnetic tape recording as a position measuring signal on playback for improved accuracy. A second detector monitors the presence or absence of the prerecorded control track signal and in the absence of, or interruption of, the control track signal switching circuits automatically switch the measuring system to the magnetic tape driven tachometer signals so as to maintain a continuous position measure.

2 Claims, 4 Drawing Figures

MAGNETIC TAPE POSITION MEASURING SYSTEM

BACKGROUND OF THE INVENTION

This invention relates to video tape recorder/reproducer systems and, in particular, to a measuring circuit for accurately determining the position of the magnetic tape.

In the operation of magnetic tape recorders, it is often required that the position of the magnetic tape, with respect to its beginning, be accurately known. Generally, this is accomplished by means of an optical or magnetic tachometer coupled to the capstan or to a roller in the tape path. The output pulses of the tachometer are processed in related circuitry to provide a tape-timer output based on the relationship which exists between the number of tachometer pulses and the image or picture frames recorded per unit measure of the magnetic tape. In this manner, the position of the tape may be expressed in terms of hours, minutes, seconds and, if desired, actual number of frames. Although widely used in commercial practice, such systems are not capable of achieving the desired or optimum accuracy because of the mechanical interface between the magnetic tape and the tachometer drive roller. The accuracy of the tape-timer readout is significantly affected, for example, by inaccurate and changing drive roller dimensions, as well as tape slippage between the magnetic tape and the drive roller. It has been proposed to utilize a prerecorded signal, identified as the control-track signal, for the tape-timer source of signals. The control-track signal is recorded on the magnetic tape simultaneously with the video signals at a rate of eight cycles per picture frame in the NTSC standards, or at a rate of ten cycles per frame for the PAL and SECAM standards. The control track is a permanent recording on the magnetic tape directly related to time and, as such, is not affected by the mechanical interface problems described above. However, not all recorded magnetic tapes contain this control track signal, and in many magnetic recordings, the control-track signal is not continuous; that is, it is intermittent due to splices, editing, and other related signal processing steps. In view of the inconsistent availability of the control-track signal, the advantages of a more accurate and repeatable display of the tape position made possible by counting cycles of the periodic control track signal have not been heretofore realized.

SUMMARY OF THE INVENTION

A measuring system is provided for determining the position of a magnetic tape in a magnetic recorder/reproducer wherein said recorder/reproducer includes a tape roller tachometer and a control track signal recorded on said magnetic tape. The system comprises first signal means responsive to the control track signal for developing a position indicating signal. Counter means are coupled to the first signal means, and are responsive to the position indicating signal for indicating the position of the magnetic tape. Second signal means are responsive to the tape roller tachometer for developing a backup position indicating signal. Detector means are coupled to the first signal means for developing a control signal determinative of the presence or absence of the control track signal. Switch means coupled to the counter means and the first and second signal means are responsive to the detector control signal for substituting the backup position indicating signal in the absence of the control track signal to provide a continuous tape position indication on the counter means.

DESCRIPTION OF THE INVENTION

Figure 1:
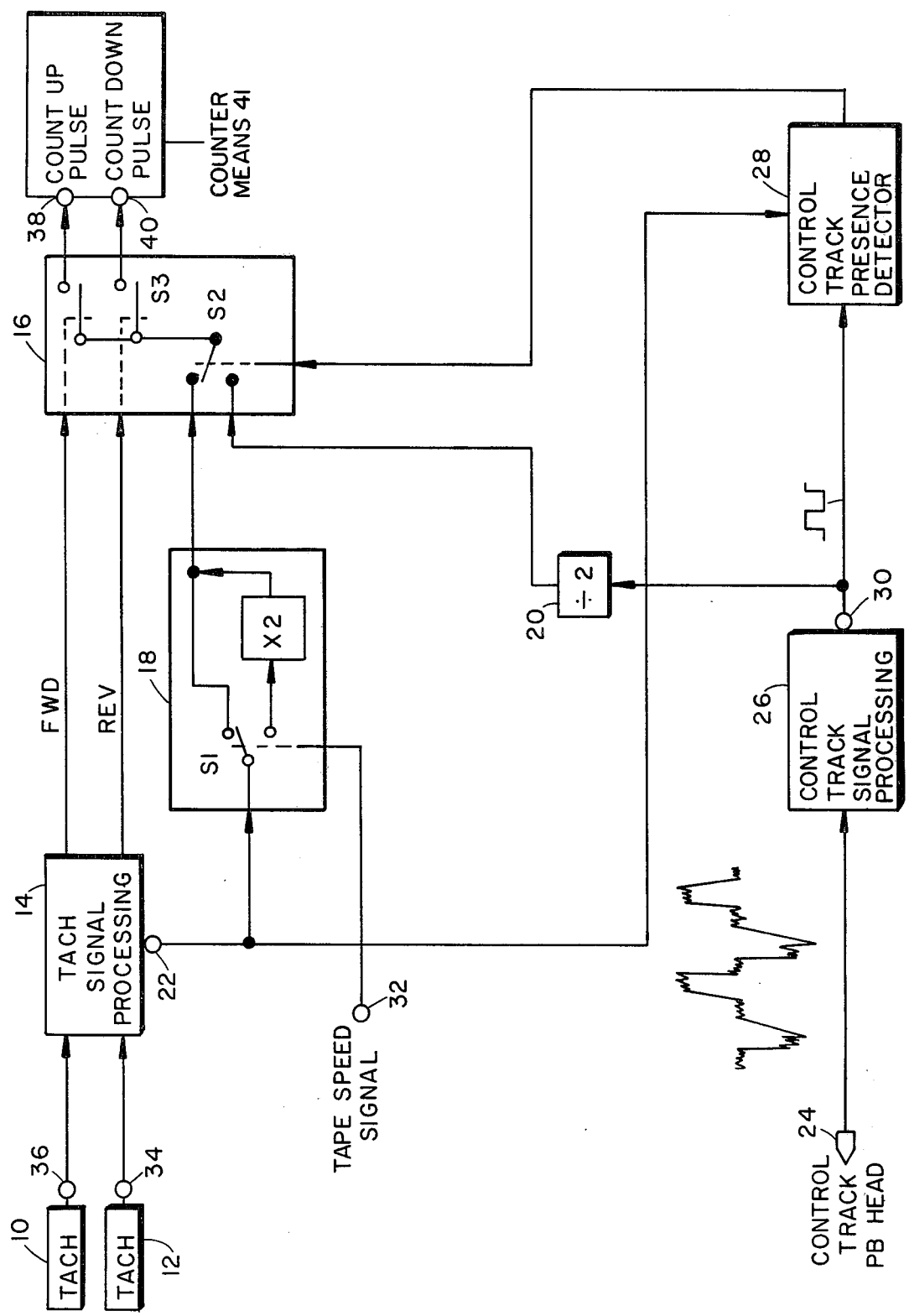
FIG. 1 is a block diagram of a system embodying the present invention.

In FIG. 1, which illustrates an embodiment of the invention as incorporated in a commercially available video magnetic recorder/reproducer (VTR), such as the Model TR-600, manufactured by RCA Corporation of Camden, New Jersey, U.S.A., two tachometers 10, 12 arranged to generate four pulses per picture frame are coupled via terminals 36, 34 to respective input terminals of a tachometer signal processing circuit 14. The tachometer pulse output signals from tachometers 10, 12 are offset in phase from each other such that their relative phasing is an indication of the direction of tape travel. Tachometer signal processor 14 generates either of two output signals, shown as forward (FWD) or reverse (REV), as determined by the relative phasing of the input tachometer signals and a tachometer count signal at terminal 22. The FWD or REV output signals are, in turn, coupled to switching circuit 16 where they are utilized to operate switch $S_3$ (shown diagrammatically) so as to place the tachometer signals from terminal 22 at terminal 38 via switches $S_1$ and $S_2$ (also shown diagrammatically), which enables the count-up circuits of an up-down counter (not shown). Similarly, if the magnetic tape is being operated in reverse, the tachometer signals from terminal 22 are coupled to terminal 40 (via switches $S_1$ and $S_2$), which enables the count-down circuits of the up-down counter. In the event the magnetic tape recorder/reproducer has a one-half speed operational mode, as is the case in the aforementioned RCA TR-600 VTR, a tape speed signal derived, for example, from the capstan motor speed control circuits of the VTR, is coupled to terminal 32 for placing switch $S_1$ at its illustrated lower contact which now couples the tachometer output signals from terminal 22 to the input terminal of a times two multiplier circuit X2, so that the tachometer signals coupled to output terminals 38 and 40 from the output terminal of the X2 circuit maintains the proper time/position pulse relationship of four pulses per unit time for the pulse input to the up-down counter.

During the time the magnetic tape is running, a magnetic playback head 24 is in contact with the magnetic tape for the purposes of reading out the control-track signal recorded on the magnetic tape. The control track signal from playback head 24 is coupled to a control-track signal processing circuit 26 for signal shaping and level control of the control-track signal pulse train. As previously mentioned, the control-track is recorded on the magnetic tape at a rate of eight pulses per frame, or at a rate of twice the pulse rate from tachometers 10 and 12; therefore, the output signal of control-track signal processor 26 at eight pulses per frame is coupled to the input terminal of a divide-by-two circuit 20, whose output signal is at four pulses per frame, which is identical with the tachometer pulse rate per frame. The output of the divide-by-two circuit is coupled to the illustrated lower contact of switch S2 of switching circuit 16, where it is available for coupling to output terminals 38 and 40 in place of the tachometer signals from tachometers 10 and 12, depending on the functioning of switch S2. The functioning of switch S2, whose position determines whether the control-track signal or the tachometer signals are coupled to the up-down counter 41, via output terminals 38 and 40, is as follows. The tachometer signal output from terminal 22 are coupled to one input of a control-trace presence detector 28, while the output of control-track signal processor 26 at terminal 30 is coupled to the other input of control-track presence detector 28. Control-track presence detector circuit 28 is arranged so that if the control track is present, an output signal from detector 28 on a control line coupled to switch S2 couples the control-track pulses from divide-by-two circuit 20 on the lower switch contact of S2 to the proper one of output terminals 38, 40. In the event the control track is not present, the tachometer signal from terminals 34, 36, applied to detector circuit 28, is coupled via the control line to switch S2 so to couple the tachometer pulses at the upper contact of switch S2 to the appropriate one of terminals 38, 40. The operation of the circuit of FIG. 1 is fully automatic, wherein the control-track signal is normally coupled to the up-down counter for improved accuracy of the time/position of the magnetic tape, and in the event the control track signals is not available, or intermittent, the tachometer signals serve as a backup signal until such time as the control track signal is again available.

Figure 2:
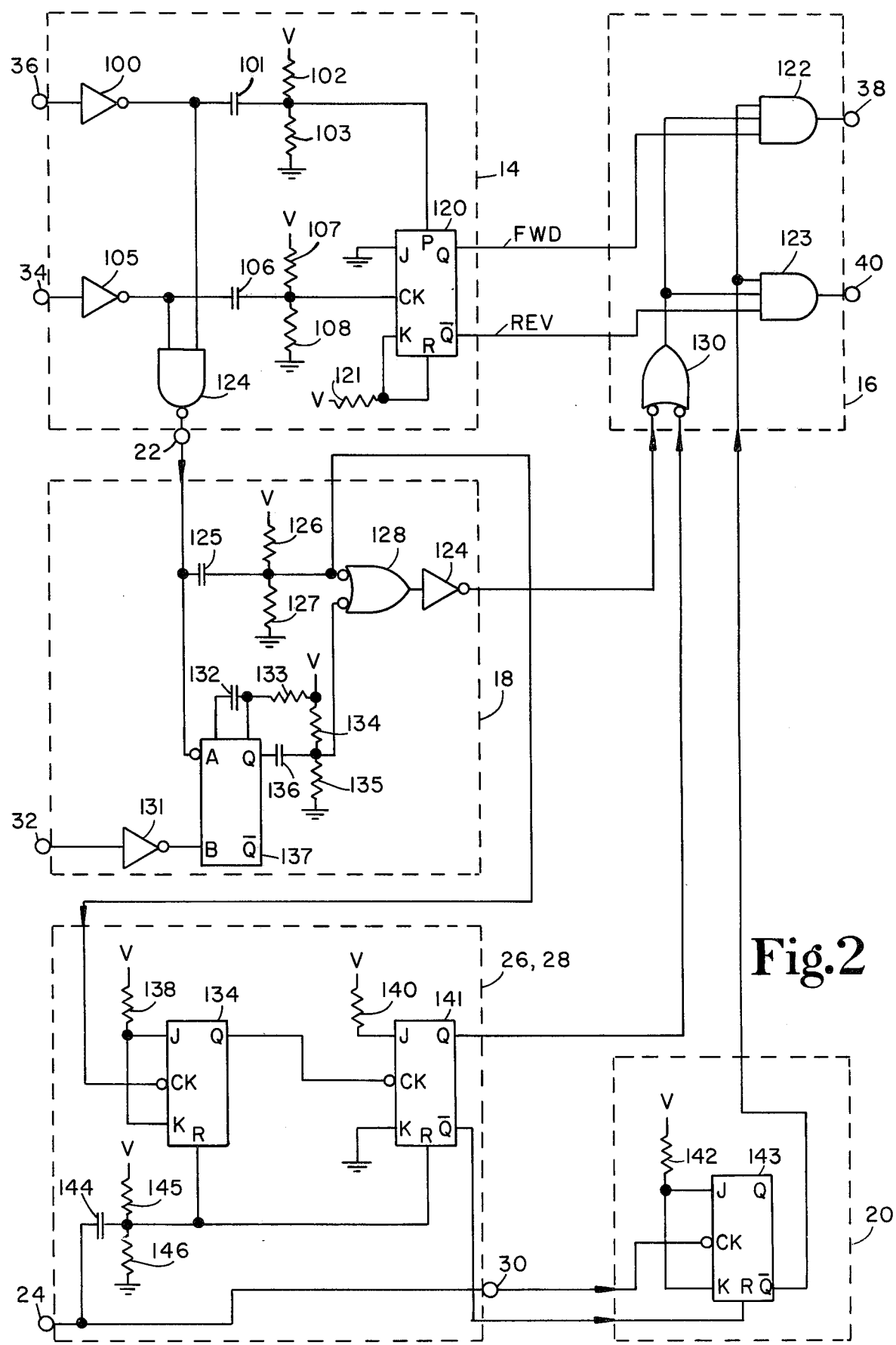
FIG. 2 is an embodiment in schematic form of the implementation of the block diagram of FIG. 1.
Figure 3:
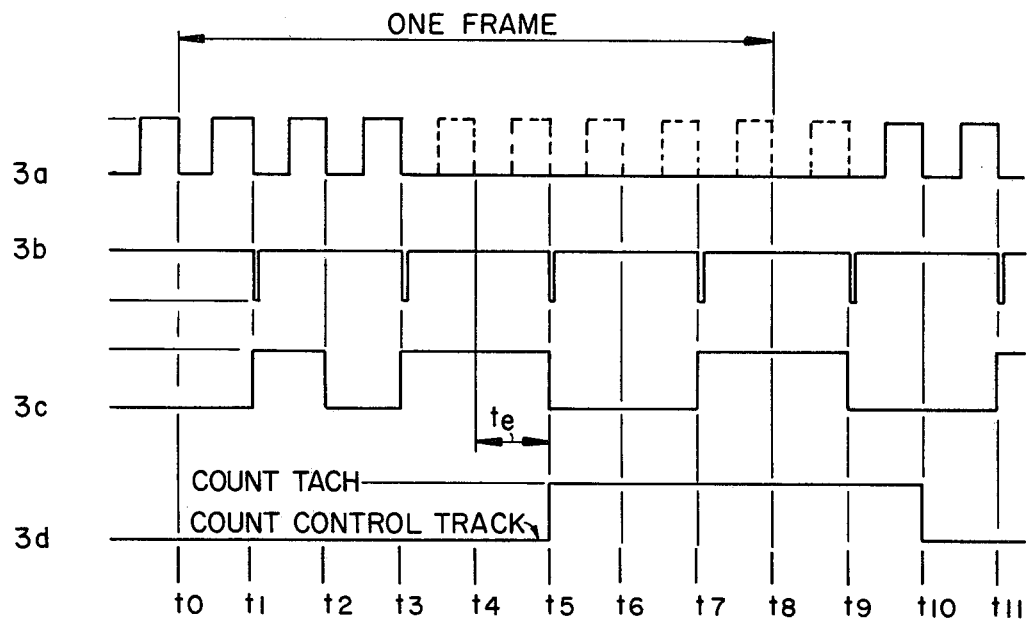
FIGS. 3 and 4 illustrate waveforms depicting the operation of the systems of FIGS. 1 and 2.

FIG. 2 illustrates a preferred embodiment of the invention in schematic form, wherein circuit components are substantially arranged in functional groups with numerals corresponding to the circuit blocks of FIG. 1.

In FIG. 2, tachometer signals from tachometers 10 and 12 are coupled to input terminals 36 and 34, where they are coupled to input buffer amplifiers 100 and 105. The output of buffer amplifiers 100 and 105 are, in turn, coupled to the preset and clock terminals of a JK flip-flop 120 by means of capacitors 101, 106 and biasing networks 102, 103 and 107, 108. The relative phasing of the tachometer signals, applied to the preset and clock terminals of JK flip-flop 120, determines the status of the Q and $\bar{Q}$ output of flip-flop 120. The Q and $\bar{Q}$ outputs, identified, as FWD and REV, are coupled to one input each of gates 122 and 123, illustrated diagrammatically as switch S3 in FIG. 1 of switching circuit 16. The output of gates 122 and 123 are coupled to terminals 38 and 40. A second input to each of gates 122 and 123 is the control-track signal applied to terminal 24, after being processed by JK flip-flop 143, which serves as a divide-by-two circuit. A third input to gates 122 and 123 of switching circuit 16 is derived from the output of gate 130, which has coupled to one of its inputs a control signal from control signal processor and presence detector 26, 28 in the form of two JK flip-flops 134, 141. The other input to gate 130 is derived from switching circuit 18, corresponding substantially to circuit block 18 of FIG. 1 and comprising monostable flip-flop 137, gate 128, and output buffer amplifier 124 and their related biasing and coupling networks. Switching circuit 18 has as its inputs a tachometer signal from tachometer signal buffer amplifiers 100, 105, via gate 124 and terminal 22, as well as a tape speed signal applied to terminal 32 by means of input buffer amplifier 131.

In operation, the tachometer pulse clocks JK flip-flop 134, which sets its Q output high. If there is a control-track pulse at terminal 24, it is applied to the reset terminals of JK flip-flop 134 and JK flip-flop 141, where it clears flip-flops 134 and 141, causing the Q output of flip-flop 134 to stay low and the $\bar{Q}$ output of flip-flop 141 to stay high. This disables the tachometer pulse at gate 130 and enables the divide-by-two control-trace pulse output of divide-by-two circuit 20 to be applied to the appropriate one of output terminals 38, 40.

If there is no control-track pulse available at terminal 24, the next tachometer pulse toggles flip-flop 134, so that its Q output goes low; this clocks flip-flop 141, and since there is no reset pulse available in the absence of a control-track signal at terminal 24, Q of flip-flop 141 goes high, enabling the tachometer pulse coupled to gate 130 via switch circuit 18 and disabling the divide-by-two circuit 20 by virtue of the $\bar{Q}$ output of flip-flop 141 going low. Since the $\bar{Q}$ output of the flip-flop 143 of divide-by-two circuit 20 is now high, the tachometer pulse from the output of gate 130 is applied to the appropriate one of output terminals 38, 40 as a backup signal.

FIGS. 3a–3d and 4a–4d illustrate waveforms depicting the operation of the circuit of FIG. 2, as described above. Waveforms 3a, 4a illustrate the control-track pulses at times $t_0$–$t_{11}$ with eight pulses $t_1$–$t_8$ defined as one frame in the NTSC system. Waveforms 3b and 4b illustrate the tachometer output pulses at terminal 22 of the tachometer signal processor 14. Waveforms 3c and 4c illustrate the status of JK flip-flop 134, while waveforms 3d and 4d illustrate the status of JK flip-flop 141.

The waveforms 3a through 3d illustrate the minimum worst case error condition, where the loss of the control-track pulses occurs just after a previous control-track pulse, for example, at time $t_3$. Since there is no reset function from terminal 24 for JK flip-flops 134 and 141, the very next tachometer pulse at time $t_5$ conditions flip-flop 141 to couple the tachometer pulses to the up-down counter, as shown by waveform 3d at time $t_5$. The tachometer pulses of waveforms 3b continue to be counted by the up-down counter until the control-track pulses reappear at time $t_{10}$, at which time a reset pulse for flip-flops 134 and 141 is again available, and the system returns to counting the control pulses, as shown by waveform 3d. Under these conditions, the error in timing/position is indicated by the time $t_e$ between time $t_4$–$t_5$. $t_e$ is equivalent to one control-track pulse or one-eighth of a picture frame of inaccuracy for the switchover to the tachometer backup signal.

Figure 4:
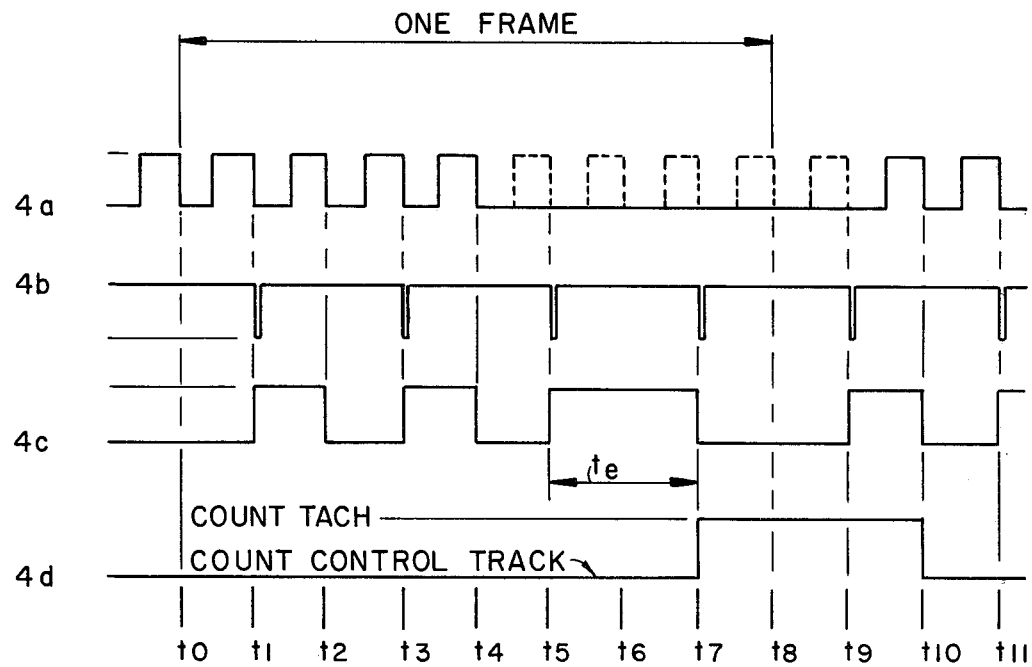

Similarly, FIGS. 4a–4d, illustrate the maximum worst case error condition for a loss of control-track pulses just before a control-track pulse at time $t_5$. As shown in FIGS. 4c and 4d, the error $t_e$ is of a duration $t_5$–$t_7$ for a duration of two control track pulses. $t_e$ is now equivalent to one-quarter of a picture frame of inaccuracy for the switchover to the tachometer backup signal.

Operational tests of the invention, as incorporated in a commercially available video tape recorder (VTR), such as the aforementioned RCA TR-600, resulted in an improvement of timing/position accuracy from three seconds, while playing back one hour of recorded material using only the tachometer signal to one-thirtieth of a second or one picture frame (30 frames equal one second in the NTSC system) when utilizing the control-track signal for counting purposes.

Although described in conjunction with the aforementioned RCA TR-600 VTR using the NTSC system, the principles of the invention are equally applicable to recorder/reproducers of other manufacture, as well as other television systems, such as the PAL and SECAM television standards. It is also feasible, where a control-track signal is not normally available, to record a periodic control signal with the main signal recording so that the advantages of the present invention may be realized.

What is claimed is:

1. A measuring system for determining the position of a magnetic tape in a magnetic recorder/reproducer wherein said recorder/reproducer includes a tape roller tachometer and a control track signal recorded on said magnetic tape, comprising:
   first signal means responsive to said control track signal for developing a first position indicating signal;
   counter means coupled to said first signal means, said counter means being responsive to said position indicating signal for indicating the position of said magnetic tape;
   second signal means responsive to said tape roller tachometer for developing a second position indicating signal;
   detector means for developing a control signal determinative of the presence or absence of said control track signal; and
   switch means coupled to said counter means and said first and second signal means, said switch means being responsive to said detector control signal for substituting said second position indicating signal only in the absence of said control track signal to provide a continuous tape position indication on said counter means.

2. A measuring system for determining the position of a web medium, comprising:
   a first reference signal encoded on said medium;
   means for sensing said first reference signal for developing a first position indicating signal;
   recording means responsive to said first position indicating signal for indicating the position of said web medium;
   a second position reference signal developed by reference generating means driven by said web medium;
   detector means responsive to said first reference signal for sensing the presence or absence of said first position indicating signal; and
   switch means coupled to said recording means, and said first and second position indicating signals, said switch means being responsive to said detector means for recording said second position reference signal only in the absence of said first position indicating signal for providing a continuous web position indication on said recording means.

* * * * *